US009097245B2

(12) United States Patent
Knoblauch-Xander et al.

(10) Patent No.: US 9,097,245 B2
(45) Date of Patent: Aug. 4, 2015

(54) METHOD AND DEVICE FOR REFILLING AND CHECKING THE LEAK-TIGHTNESS OF A FUEL INJECTOR

(75) Inventors: Marc Knoblauch-Xander, Vaihingen-Enz (DE); Bernd Kohler, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/004,467

(22) PCT Filed: Jan. 11, 2012

(86) PCT No.: PCT/EP2012/050352
§ 371 (c)(1),
(2), (4) Date: Nov. 13, 2013

(87) PCT Pub. No.: WO2012/123134
PCT Pub. Date: Sep. 20, 2012

(65) Prior Publication Data
US 2014/0053915 A1 Feb. 27, 2014

(30) Foreign Application Priority Data
Mar. 11, 2011 (DE) .............................. 102011005428

(51) Int. Cl.
*F17D 1/16* (2006.01)
*F04B 23/00* (2006.01)
*F02M 37/00* (2006.01)
*F02D 41/22* (2006.01)
(Continued)

(52) U.S. Cl.
CPC .............. *F04B 23/00* (2013.01); *F02D 41/221* (2013.01); *F02M 37/0052* (2013.01); *F02M 61/167* (2013.01); *F02M 65/00* (2013.01); *F02D 41/2096* (2013.01); *F02M 51/0603* (2013.01); *F02M 2200/705* (2013.01); *Y02T 10/40* (2013.01)

(58) Field of Classification Search
CPC . F02M 37/0052; F02M 63/0225; F04B 23/00
USPC .............................. 137/14; 123/510, 511, 514
See application file for complete search history.

(56) References Cited

U.S. PATENT DOCUMENTS 4,561,297 A * 12/1985 Holland ...................... 73/114.45
4,926,829 A * 5/1990 Tuckey ......................... 123/497
(Continued)

FOREIGN PATENT DOCUMENTS

DE 19709422 9/1998
DE 19743668 4/1999
(Continued)

OTHER PUBLICATIONS

International Search Report for PCT/EP2012/050352, issued on May 21, 2012.

*Primary Examiner* — John K Fristoe, Jr.
*Assistant Examiner* — Reinaldo Sanchez-Medina
(74) *Attorney, Agent, or Firm* — Kenyon & Kenyon LLP

(57) ABSTRACT

A method for refilling an emptied hydraulic coupler of a fuel injector comprises the steps of: connecting a pressure generator to a return line of the fuel injector; operating the pressure generator in order to generate a return pressure in the return line; operating the fuel injector. The method can also include the step of monitoring the pressure level in the return line.

22 Claims, 2 Drawing Sheets

(51) Int. Cl.
*F02M 61/16* (2006.01)
*F02M 65/00* (2006.01)
*F02D 41/20* (2006.01)
*F02M 51/06* (2006.01)

(56) References Cited

U.S. PATENT DOCUMENTS

| | | | |
|---|---|---|---|
| 5,285,759 A * | 2/1994 | Terada et al. | 123/514 |
| 5,445,019 A | 8/1995 | Glidewell et al. | |
| 6,168,133 B1 * | 1/2001 | Heinz et al. | 251/57 |
| 7,568,471 B2 * | 8/2009 | Harper et al. | 123/514 |
| 7,669,570 B2 * | 3/2010 | Hubl et al. | 123/179.9 |
| 2003/0150426 A1 | 8/2003 | Tanabe et al. | |

FOREIGN PATENT DOCUMENTS

| | | |
|---|---|---|
| DE | 10101800 | 7/2002 |
| DE | 10104016 | 8/2002 |
| DE | 102007006486 | 8/2008 |
| EP | 2226494 | 9/2010 |
| GB | 2149011 | 6/1985 |
| GB | 2277386 | 10/1994 |
| WO | WO2004/040127 | 5/2004 |

* cited by examiner

METHOD AND DEVICE FOR REFILLING AND CHECKING THE LEAK-TIGHTNESS OF A FUEL INJECTOR

FIELD OF THE INVENTION

The invention relates to a method and an apparatus for refilling and for checking the leak tightness of a hydraulic coupler, as used in fuel injectors and in particular piezoelectrically driven fuel injectors.

BACKGROUND INFORMATION

The purpose of the injectors in a fuel injection system is to inject the fuel volume requested by the control unit into the combustion chamber of the engine at a predefined point in time. Common rail diesel injection systems having so-called piezo injectors, which have a piezoelectrically driven actuator module, have been in production use for several years. One of the special design features of piezo injectors is the hydraulic coupler. The hydraulic coupler equalizes temperature-related changes in the length of the actuator module. One prerequisite for proper functioning of the injector is that the coupler space be completely filled with fuel during operation. An incompressible liquid volume in the coupler space then allows force to be transferred from the actuator to the switching valve of the injector.

A further prerequisite for proper functioning of the injector is that a counter-pressure be present in the injector return line. The counter-pressure is generated as a rule by a constant pressure valve (CPV) or a throttling element located in the injector return line.

If the coupler space is not completely filled with fuel, and if instead an air cushion has accumulated in the coupler space, this results in negative effects on injector function. Force transfer from the actuator to the switching valve is impaired as a result of the compressibility of the air/fuel mixture in the coupler space. The injection volume decreases as a function of the size of the enclosed air volume; in the worst case the injection volume becomes zero. The result of this is that the engine is no longer capable of running.

The air inclusion can result, for example, from repair work on the fuel system, running the tank dry, defects in the constant pressure valve, fuel degassing effects, or incorrect installation or storage of the injector.

Lack of counter-pressure in the return line, as well as failure to inject because of an empty coupler, result in engine missing and failure to start. Neither defect can be detected by the control unit; this makes fault localization very difficult.

Also known are numerous end-of-the-line faults in which vehicles can no longer be started because of empty couplers or defective constant pressure valves. The subsequent troubleshooting in such cases is always complex.

In order to restore injector function and allow the engine to run again, the only possibility that remains in many cases is to replace emptied injectors with new parts. As delivered, the injectors are filled at the factory with a testing oil in order to ensure injector function.

British Published Patent Appln. No. 2 277 386 describes a diagnostic system for detecting malfunctioning fuel injectors for an internal combustion engine, having an injector controller for individual application of control to the injectors, which are connected to a fuel distributor. Pressure sensors are mounted on the fuel distributor in order to detect pressure waves that result from the operation of the individual injectors.

A signal processing apparatus is provided in order to process the pressure signals of the pressure sensors. The output signal of the signal processing apparatus corresponds to the fuel flow rate through the fuel injectors. An output signal of this kind can be used to inform an operator of the engine of a malfunction of the fuel injectors. The output signal can also be delivered to a fuel injector control apparatus in order to adapt the actuation duration of the injectors so that a desired flow rate for each activation is achieved.

SUMMARY

An object of the invention is to make available a standard shop method and a standard shop device for refilling completely or partly emptied couplers of fuel injectors, and/or for checking the leak tightness of the injector and of the return system.

A method according to the present invention for refilling an emptied hydraulic coupler of a fuel injector encompasses the steps of connecting a pressure generator to a return line of the fuel injector; operating the pressure generator in order to generate a return pressure in the return line; and lastly operating the fuel injector at the elevated return pressure in the return line.

The invention also encompasses a pressure generator that is embodied for connection to the return line of a fuel injector.

With the method according to the present invention utilizing a pressure generator according to the present invention it is possible, in particular in injection systems having piezo fuel injectors, to build up in the injector the counter-pressure necessary for operation when the injector has previously been emptied. The result is that the functionality of the injector is restored and the engine can once again run. Emptied injectors therefore do not need to be replaced with new parts.

Defects in the return system of the injectors, for example impermissible pressure losses at the constant pressure valve, can also be detected.

The invention makes it possible to isolate the fault quickly and, as necessary, to replace specific components and refill the coupler.

The invention is easy to utilize, and the time required is short. The enormous costs resulting from the replacement of injectors in the event of a fault can be eliminated by the invention.

In an embodiment of the method, the pressure generator is operated in such a way that the return pressure is equal to 5 to 25 bar. In particular, a predefined desired return pressure in the range between 5 and 25 bar is generated by suitable operation of the pressure generator. In this fashion, the injector to be filled is always operated at its optimum return pressure, which is predefined by its design.

In an embodiment of the method, the return pressure is held constant during operation of the fuel injector. Optimum operation of the fuel injector is thereby ensured.

In an alternative embodiment, an alternating-pressure load is applied in the return line.

In an embodiment, the pressure generator generates the elevated pressure in the return line by compressing a gas, in particular air. Pressure generation by compressing air is particularly easy and economical to implement, since air can be taken from the environment at no cost. In addition, the compressibility of the gas equalizes undesired pressure fluctuations to a certain extent.

In a further embodiment, a pressure threshold load is applied on the injector return. The result is that venting of the injector is optimized or, depending on the injector design, made possible in the first place.

In an alternative embodiment, the return pressure is generated by compressing a liquid, e.g. (diesel) fuel or a test oil. Because a liquid is practically incompressible as compared with a gas, an elevated pressure can be generated particularly efficiently because it is not necessary to compress the liquid itself in order to generate an elevated pressure in the return line.

In an embodiment, a constant pressure valve is provided in the return line, and the method according to the present invention includes checking the function of the constant pressure valve.

Thanks to a constant pressure valve in the return line, the pressure in the return line can always be set to the optimum value for operation of the fuel injector, so that the fuel injector can be operated particularly effectively.

A method according to the present invention also makes it possible to check a constant pressure valve of this kind in particularly simple and efficient fashion, in order to allow malfunctions of the fuel injectors or of the engine that are attributable to a defective constant pressure valve to be detected and, as applicable, eliminated.

In an embodiment of a pressure generator according to the present invention, the pressure generator has a pressure measuring device (manometer) that is embodied to monitor the pressure generated by the pressure generator or the pressure in the return line. A pressure measuring device of this kind allows the desired pressure in the return line to be established exactly, and in particular allows excessive pressure in the return line, which can cause damage to components of the injection system, to be avoided.

The pressure generator can additionally have an overpressure valve that automatically opens when a predefined pressure is exceeded, in order to avoid a hazardous overpressure in the return line. The pressure at which an overpressure valve of this kind opens can be, for example, 30 bar, so that a return pressure in the range from 5 to 25 bar can be established in the return line but a considerable and hazardous exceedance of the maximum desired return pressure of 25 bar is reliably and automatically avoided.

The pressure generator can have an electrically operated compressor that is embodied to generate the overpressure in the return line. An electrically operated compressor allows the elevated pressure in the return line to be generated in particularly simple and convenient fashion; in particular, a compressor of this kind can have control applied to it via a suitable control circuit in such a way that a predefined pressure is generated in the return line.

Alternatively or additionally, a manual pump can be provided, for example, for pressure generation. A pressure generator having a manual pump is particularly cost-effective and low-maintenance, and moreover allows an elevated pressure to be generated in the return line even without additional electrical power, for example for use in a breakdown situation.

DETAILED DESCRIPTION

Figure 1:
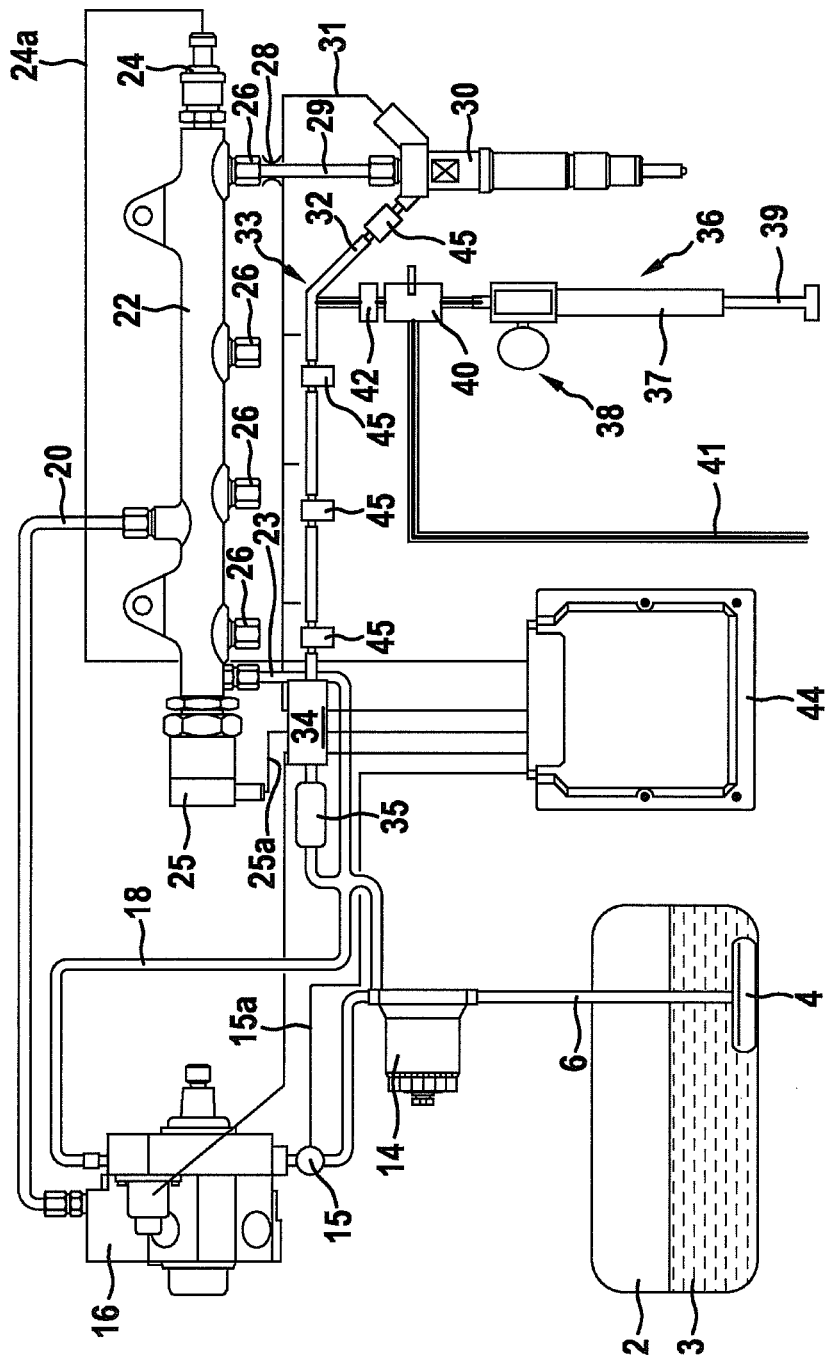
FIG. 1 is a schematic view of a fuel injection system having a pressure generator according to the present invention.

FIG. 1 schematically depicts an exemplifying embodiment of a fuel injection system having a pressure generator 36 according to the present invention.

The injection system has a tank 2 for storing fuel 3 that is to be injected.

During operation, fuel 3 is withdrawn from tank 2 through a pre-filter 4 that is disposed inside tank 2, and through a fuel withdrawal line 6.

Fuel 3 withdrawn from tank 2 is conveyed through a fuel filter 14 to a fuel pump 16 that is preferably embodied as a high-pressure fuel pump 16.

Provided between fuel filter 14 and the inlet of fuel pump 16 is a temperature sensor 15 that measures the temperature of fuel 3 that is flowing into fuel pump 16, and supplies the measured temperature value via a signal lead 15a to a control unit 44.

Fuel pump 16 causes the desired elevated injection pressure to be applied to the fuel, and conveys the fuel at elevated pressure via a pressure line to a fuel distributor ("common rail") 22.

Excess fuel is conveyed via a return line 18 back to the inlet of fuel pump 16.

Fuel distributor 22 is of substantially tubular configuration, a pressure sensor 24 and a pressure control valve 25 being respectively mounted at the two end faces of tube 22. Pressure sensor 24 and pressure control valve 25 are connected via electrical control leads 24a, 25a to control unit 44. Pressure sensor 24 measures the pressure of fuel 3 in fuel distributor 22 and outputs a corresponding electrical signal to control unit 44. Control unit 44 compares the pressure ascertained by pressure sensor 24 with a predefined desired fuel pressure in fuel distributor 22, and regulates fuel pump 16, and/or pressure control valve 25 disposed at an opposite end of fuel distributor 22, in such a way that the desired fuel pressure is established within fuel distributor 22. Excess fuel is removed from fuel distributor 22 through a discharge line 23 and conveyed back to the inlet of fuel pump 16.

Multiple connectors 26 (four, in the example shown in FIG. 1) each for connecting one fuel injector 30 are embodied on the circumference of the tubular fuel distributor 22.

In the exemplifying embodiment shown in FIG. 1, the fuel injector 30 shown is one that is hydraulically connected to fuel distributor 22 via a throttling element 28 and a fuel line 29.

Fuel injector 30 has control applied to it via an electrical control lead 31 that is connected to control unit 44.

A return line 32 is connected via an injector connector 45 to fuel injector 30 and leads from fuel injector 30 to the outlet side of fuel filter 14, in order to bring excess fuel 3 out of fuel injector 30 back to the inlet side of high-pressure pump 16 so that it can be introduced again into fuel injector 30.

A constant pressure valve 35, which is embodied to establish and maintain a defined pressure in return line 32 during operation, is provided in return line 32.

Provided before constant pressure valve 35 in the flow direction is a shutoff apparatus 34 that is embodied, for example, as a Matra shutoff. Shutoff apparatus 34 makes it possible, for diagnostic purposes, to shut off the discharge of fuel from return line 32 or keep it at a specific pressure, for example in order to detect leaks in return line 32 or in fuel injectors 30, or defects in constant pressure valve 35.

Pressure generator 36 according to the present invention is connected to return line 32. Connection can occur with the aid of an adapter 33 between a injector connector 45 and return line 32. Adapter 33 can be embodied with an automatic or manually actuated valve in order to enable connection and removal of pressure generator 36 with no pressure loss in return line 32.

A pressure generator 36 according to the present invention is connected to return line 32. Pressure generator 36 has a pressure cylinder 37 having a pressure piston 39 movable therein, such that an elevated pressure can be generated in pressure cylinder 37 by moving pressure piston 39. Pressure cylinder 37 is filled with a gas, e.g. air, or with a liquid, e.g. (diesel) fuel or a suitable test oil.

Pressure piston 39 can be driven manually (manual operation) or by a preferably electric motor (not shown in FIG. 1) in order to elevate the pressure in pressure cylinder 37.

Also possible are other forms (not shown) of a pressure container 37 in which an elevated pressure is generated by a suitable pump apparatus 39.

A pressure measuring apparatus 38 (manometer), at which the pressure existing in pressure piston 37 can be read, is provided on pressure piston 37.

Pressure measuring apparatus 38 can be embodied as an electrical pressure gauge 38.

Provided between pressure piston 37 and adapter 33 is a relief valve 40 which is embodied in such a way that it opens, and allows gas or liquid to flow out of pressure piston 37 through a relief line 41, when a predefined pressure in pressure piston 37 is exceeded. Relief valve 40 serves as a safety valve in order to prevent damage to return line 32, to fuel injector 30, or to other components of the injection system as a result of excessive pressure in return line 32.

A filter 42 is provided on return line 32 between relief valve 40 and connection point 33 of pressure generator 36 in order to prevent dirt particles from traveling out of pressure piston 37 into the return line, where they can cause clogging and possibly damage to constant pressure valve 35 and/or to fuel pump 16.

In order to refill a partly or completely emptied injector 30, pressure generator 36 is connected to return line 32 with the aid of adapter 33, as shown in FIG. 1. Actuation of pressure piston 39 causes a desired elevated pressure to be generated in pressure piston 37 and therefore also in return line 32. The system makes it possible to build up the pressure in return line 32 up to the maximum pressure of constant pressure valve 35.

The pressure buildup in return line 32 and in pressure piston 37 can be read from and monitored on pressure gauge 38.

Once the desired pressure has been built up in return line 32, the engine (not shown in the Figure) is started, and fuel is injected through injector 30 into the combustion chamber of the engine.

When a compressor is used for pressure generation, the pressure level can be held constant during the starting operation, if applicable, by supplying further gas or liquid into pressure cylinder 37. With hand pumps having a manually operated pressure piston 39, it is possible and necessary to continue pumping as applicable.

The pressure thereby built up in return line 32 causes generation of a pressure cushion in the coupler of injector 30, which results in a "stiffening" of the coupler unit. This ensures that the actuator stroke is transferred to the switching valve inside injector 30, and injector 30 is again functional.

As operation continues, the air that has collected in the coupler of injector 30 is discharged through return line 32, so that after a certain amount of operating time injector 30 is operational even without the additional pressure generator 36.

Pressure measuring device 38 of pressure generator 36 can also be used simultaneously to check the leak tightness and "switching pressure" of constant pressure valve 35.

In the case of a constant pressure valve 35 affected by leakage, or in systems that have a throttling element instead of a constant pressure valve 35, the pressure buildup can be achieved by shutting off return line 32 with the aid of a shutoff apparatus 34 or an adapted constant pressure valve. Shutoff apparatus 34 can be disposed in the flow direction before or after the original constant pressure valve 35.

A partly or completely emptied injector 30 can be refilled in simple and economical fashion by using a pressure generator 36 in a method according to the present invention; in particular, the complexity and cost involved in installing and removing or replacing an injector 30 are eliminated. At the same time, the return system, including injector 30, can be checked for leak tightness.

Figure 2:
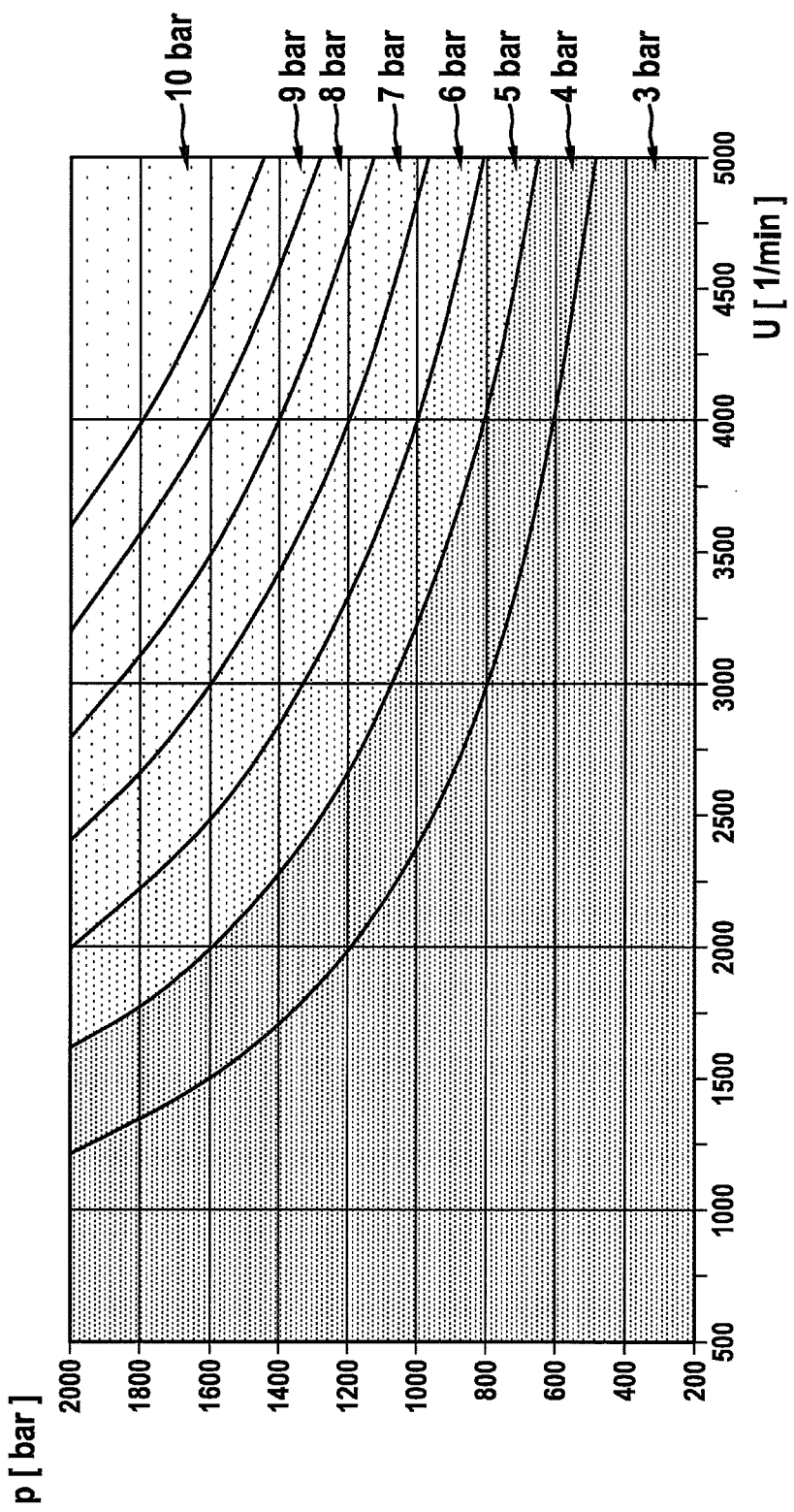
FIG. 2 shows the minimum necessary counter-pressure in the return line as a function of fuel injection pressure and engine speed.

FIG. 2 is a diagram showing the pressure in return line 32 necessary for correct functioning of the engine, as a function of the rotation speed U (X axis) of the engine and the pressure p (Y axis) in fuel distributor 22.

The diagram shows that the pressure necessary in return line 32 rises both with the engine speed U and with the pressure p in fuel distributor 22, so that, in particular, high engine speeds U and high pressures p in fuel distributor 22 necessitate high pressures of up to 10 bar in return line 32.

At low engine speeds U and/or a lower pressure p in fuel distributor 22, on the other hand, a lower pressure of e.g. 3 bar in return line 32 is sufficient.

What is claimed is:

1. A method for refilling a hydraulic coupler of a fuel injector, the method comprising:
    connecting a pressure generator to a return line of the fuel injector, wherein excess fuel is conveyable via the return line back to an inlet of a fuel pump external to a fuel tank for pumping fuel from the fuel tank via a pressure line to a fuel distributor having a connector to connect to the fuel injector, so that the excess fuel is returnable to the fuel injector, wherein the return line includes a constant pressure valve to maintain a defined pressure in the return line;
    generating an elevated pressure in the return line by operating the pressure generator; and
    operating the fuel injector;
    wherein the pressure generator includes an adapter to connect an injector connector and the return line, wherein the adapter is configured to enable connection and removal of the pressure generator arrangement with no pressure loss in the return line, and wherein the pressure generator arrangement includes a pressure cylinder or a pressure container so that an elevated pressure is generatable.

2. The method as recited in claim 1, wherein the elevated pressure in the return line is equal to 5 to 25 bar.

3. The method as recited in claim 1, further comprising:
    holding constant the elevated pressure in the return line during operation of the fuel injector.

4. The method as recited in claim 1, further comprising:
    applying an alternating-pressure load in the return line.

5. The method as recited in claim 1, wherein the elevated pressure in the return line is generated by compressing one of a gas and a liquid.

6. The method as recited in claim 5, wherein the gas includes air and the liquid includes one of a fuel and a testing oil.

7. The method as recited in claim 1, further comprising:
    checking a function of the constant pressure valve provided in the return line.

8. The method as recited in claim 1, wherein the pressure generator arrangement includes the pressure cylinder, which includes a pressure piston movable therein, such that an elevated pressure can be generated in the pressure cylinder by moving the pressure piston.

9. The method as recited in claim 8, wherein the pressure generator arrangement includes a pressure measuring apparatus, on the pressure piston, at which a pressure existing in the pressure piston is readable.

10. The method as recited in claim 9, wherein a relief valve is provided between the pressure piston and the adapter, the relief valve being configured so that it opens and allows a fluid to flow out of the pressure piston through a relief line when a predefined pressure in the pressure piston is exceeded, so that the relief valve serves as a safety valve to prevent damage to the return line or the fuel injector as a result of excessive pressure in the return line.

11. The method as recited in claim 1, wherein the pressure generator arrangement includes the pressure container, in which the elevated pressure is generated by a pump apparatus.

12. The method as recited in claim 11, wherein a relief valve is provided between the pressure piston and the adapter, the relief valve being configured so that it opens and allows a fluid to flow out of the pressure piston through a relief line when a predefined pressure in the pressure piston is exceeded, so that the relief valve serves as a safety valve to prevent damage to the return line or the fuel injector as a result of excessive pressure in the return line.

13. A pressure generator, comprising:
    a pressure generator arrangement having an adapter to provide a connection for connecting to a return line of a fuel injector;
    wherein the adapter is configured to connect an injector connector and the return line,
    wherein the adapter is configured to enable connection and removal of the pressure generator arrangement with no pressure loss in the return line, and
    wherein the pressure generator arrangement includes a pressure cylinder or a pressure container, such that an elevated pressure is generatable.

14. The pressure generator as recited in claim 13, further comprising:
    a pressure measuring device for monitoring a pressure generated by the pressure generator.

15. The pressure generator as recited in claim 14, further comprising:
    one of a compressor and a manual pump for pressure generation.

16. The pressure generator as recited in claim 13, further comprising:
    an overpressure valve configured so that the overpressure valve opens when the pressure generated by the pressure generator one of reaches and exceeds a predefined limit value.

17. The pressure generator as recited in claim 16, wherein the predefined limit value is 30 bar.

18. The pressure generator as recited in claim 13, wherein the pressure generator arrangement includes the pressure cylinder, which includes a pressure piston movable therein, such that an elevated pressure can be generated in the pressure cylinder by moving the pressure piston.

19. The pressure generator as recited in claim 18, wherein the pressure generator arrangement includes a pressure measuring apparatus, on the pressure piston, at which a pressure existing in the pressure piston is readable.

20. The pressure generator as recited in claim 19, wherein a relief valve is provided between the pressure piston and the adapter, the relief valve being configured so that it opens and allows a fluid to flow out of the pressure piston through a relief line when a predefined pressure in the pressure piston is exceeded, so that the relief valve serves as a safety valve to prevent damage to the return line or the fuel injector as a result of excessive pressure in the return line.

21. The pressure generator as recited in claim 13, wherein the pressure generator arrangement includes the pressure container, in which the elevated pressure is generated by a pump apparatus.

22. The pressure generator as recited in claim 21, wherein a relief valve is provided between the pressure piston and the adapter, the relief valve being configured so that it opens and allows a fluid to flow out of the pressure piston through a relief line when a predefined pressure in the pressure piston is exceeded, so that the relief valve serves as a safety valve to prevent damage to the return line or the fuel injector as a result of excessive pressure in the return line.

* * * * *